(12) United States Patent
Tatsuno

(10) Patent No.: US 7,527,394 B2
(45) Date of Patent: May 5, 2009

(54) IMAGE-DISPLAYING APPARATUS

(75) Inventor: Hibiki Tatsuno, Yokohama (JP)

(73) Assignee: Ricoh Company, Ltd., Tokyo (JP)

( * ) Notice: Subject to any disclaimer, the term of this patent is extended or adjusted under 35 U.S.C. 154(b) by 175 days.

(21) Appl. No.: 11/200,289

(22) Filed: Aug. 10, 2005

(65) Prior Publication Data
US 2006/0044795 A1   Mar. 2, 2006

(30) Foreign Application Priority Data
Aug. 31, 2004   (JP) ............................. 2004-253052

(51) Int. Cl.
*F21S 8/00* (2006.01)

(52) U.S. Cl. ..................... 362/268; 362/331; 362/332; 362/339; 359/619; 359/620; 359/625; 359/640; 359/830

(58) Field of Classification Search ................ 362/268, 362/227, 235–237, 240, 244, 246, 311, 326, 362/331, 332, 339, 800; 359/438, 496, 619, 359/620, 625, 638, 640, 830–839
See application file for complete search history.

(56) References Cited

U.S. PATENT DOCUMENTS

| | | | | | |
|---|---|---|---|---|---|
| 5,757,341 | A | * | 5/1998 | Clarke et al. | 345/32 |
| 5,991,082 | A | * | 11/1999 | Tsunashima et al. | 359/618 |
| 2003/0147151 | A1 | * | 8/2003 | Hwang | 359/742 |
| 2004/0080718 | A1 | * | 4/2004 | Kojima | 353/55 |
| 2004/0129945 | A1 | * | 7/2004 | Uemura | 257/98 |
| 2004/0252958 | A1 | * | 12/2004 | Abu-Ageel | 385/133 |
| 2004/0263500 | A1 | * | 12/2004 | Sakata | 345/204 |
| 2005/0174775 | A1 | * | 8/2005 | Conner | 362/268 |
| 2005/0237495 | A1 | * | 10/2005 | Peterson et al. | 353/94 |

FOREIGN PATENT DOCUMENTS

| | | | |
|---|---|---|---|
| JP | 2001-249400 | | 9/2001 |
| JP | 3257646 | | 12/2001 |
| JP | 2001343706 A | * | 12/2001 |
| JP | 2002-208386 | | 7/2002 |
| JP | 2002-244211 | | 8/2002 |
| JP | 2003-241148 | | 8/2003 |
| JP | 2004-146200 | | 5/2004 |
| JP | 2004-177435 | | 6/2004 |

* cited by examiner

*Primary Examiner*—Sharon Payne
*Assistant Examiner*—Mary Zettl
(74) *Attorney, Agent, or Firm*—Oblon, Spivak, McClelland, Maier & Neustadt, P.C.

(57) ABSTRACT

An image-displaying apparatus comprising a light-emitting diode, a relay lens, a secondary light source-forming prism arranged between the light-emitting lens and the relay lens, and a light valve, said secondary light source-forming prism having opposed first and second opposed rectangular planes and at least four polygonal planes, said first and second rectangular planes being positioned on sides of the light-emitting diode and the light valve, respectively, and an area of the first rectangular plane being greater than that of the second rectangular plane, wherein a light emitted from the light-emitting diode is illuminated upon the light valve through the relay lens and the secondary light source-forming prism.

55 Claims, 5 Drawing Sheets (Prior Art)

IMAGE-DISPLAYING APPARATUS

This application claims the convention priority of Japanese Patent Application No. 2004-253052 filed on Aug. 31, 2004, the disclosure of which is entirely incorporated herein by reference.

BACKGROUND OF THE INVENTION

1. Field of the Invention

The present invention relates to an image-displaying apparatus, particularly suitable for a projector or an image-observing apparatus.

2. Related Art Statement

There are currently, commonly available two types of color display methods for projectors. One type is a color-mixing method in which light emitted from a white thermal light source is divided into three primary colors: red, green and blue, three light valves are illuminated with three color lights, respectively, the lights modulated by the respective light valves are combined with a color-combining optical system such as a cross dichroic prism, and an illumination light of the three primary colors modulated by the light valves is constantly illuminated upon each of pixels on a screen. The other is a time-shared color-mixing system in which the three primary colors are divided in terms of time and the divided colors are successively projected upon the screen. The former type is called a "three-plate system" because three light valves are used. The latter is called a "single-plate system" because one light valve has only to be used.

In order to downsize the projector, the single-plate system is more desirable from the standpoint of the cost, because the three-plate system requires a space for a color-separating optical system and the three light valves. On the other hand, a so-called thermal light source lamp such as a super high pressure mercury lamp or a xenon lamp is used for the single-plate system as well as the three-plate system in the case of the conventional projectors. Since the above thermal light source is used as an illuminating light source, an input electric power needs to be large, because the conversion efficiency from the input power to the light is low. Consequently, dimensions of the power source and the lamp (which is provided with a reflector mirror in many cases) become large, and a cooling fan is necessary, Thus, such a system is heavy, and the span of life is shortened because of heat in the case of the light valve, particularly the liquid crystal valve.

Under the circumstances, there are various proposals that light emitting diodes (hereinafter abbreviated as "LEDs") which have been actively being developed are used as light sources for the projectors. The LED generally possesses advantages such as long span of life, high efficiency, high-speed response, unicolor light emission, etc. Further, since the LED further possesses rapidly increased brightness, such LED devices have been expected to be applied to many illuminating fields.

As the technique for using the LED in the projector, JP-A 2001-249400 is recited, for example. According to this publication, an array of light-emitting devices is used as a light source, each of the light-emitting devices inside the array illuminates the entire light-modulating area of the light valve (light modulator), and color displaying is carried out by turning on or off the light-emitting devices for the three primary colors at a high speed.

The above color displaying is possible in such a method with respect to reflection type liquid crystal display devices described in JP-A 2002-244211 and JP-A 2003-241148 and a display device, such as DMD, in which light-modulation information on a surface of a light valve is changed in a lump.

As the prior art, there are further JP-A 2004-146200 and Japanese Patent No. 3,257,646. A prism described in JP-A 2004-146200 is intended for a direct-view type organic EL display device. Because of the direct view type, this prism is aimed only at effectively taking out image-displaying light from each pixel in a front face direction. A prism in Japanese patent No. 3,257,646 is aimed only at branching laser beam of a light source.

However, the LED has a light intensity distribution, generally so-called "orientated light distribution", in which intensities of light ordinarily differ from one another, depending upon emitting angles. In case of a bared chip type LED, the orientated light distribution is usually a so-called "Lambert" distribution.

FIG. 15 shows a orientated light distribution of an LED of the bared chip type. As shown in FIG. 15, the light intensity in a θ-direction varies according to cos θ in which θ is an angle from the center of the LED 100 in a light-emitting direction.

FIG. 16 shows the construction of an image-displaying apparatus using the LEDs having the orientated light distribution as shown in FIG. 15. When the entire light valve 102 is illuminated with a plurality of the LEDs 100 via a release lens 101, the orientated light distributions of the LEDs 100, 100 are interposed upon each other as shown in FIG. 16, so that uneven illuminance appears on the light valve 102.

Such a characteristic naturally appears in a so-called bombshell type LED formed when the LED is coupled with a lens.

In order to solve the problem on the above orientated light distribution and characteristic of the light source (LED), light flux from the light source is generally divided into plural ones by using a cable stitch lens unit.

However, it is not practical to couple the cable stitch lens unit to the LEDs. Even if the former is coupled to the latter, the size of each of lenses constituting the cable stitch lens unit becomes extremely small. Thus, if the entire surface of the light valve is to be illuminated with secondary light sources formed by the respective lenses inside the cable stitch lens unit at an a focal magnification of the relay lens system, the illuminating system becomes extremely large in the optical-axis direction.

If the light is led from each of the LEDs to the light valve as much as possible, the F-number of the release lens system for leading the light from the LEDs to the light valve becomes smaller, which results in the increased lens diameter and the increased number of the aberration-correcting lenses.

SUMMARY OF THE INVENTION

The present invention, which has been made in view of the above problems, is to provide an image-displaying apparatus which can reduce uneven illuminance of a light valve and can perform bright illumination even if the F-number is large. The invention is to further provide a projector and an image observing apparatus each using such an image-displaying apparatus.

In order to accomplish the above object, the present invention is directed to an image-displaying apparatus comprising a light-emitting diode, a relay lens, a secondary light source-forming prism arranged between the light-emitting lens and the relay lens, and a light valve, said secondary light source-forming prism having opposed first and second opposed rectangular planes and at least four polygonal planes, said first and second rectangular planes being positioned on sides of the light-emitting diode and the light valve, respectively, and an area of the first rectangular plane being greater than that of the second rectangular plane, wherein a light emitted from the light-emitting diode is illuminated upon the light valve through the relay lens and the secondary light source-forming prism.

The following are preferred embodiments of the image-displaying apparatus. Any combinations of them are also preferred embodiments of the invention, so long as no contradictions occur against the present invention.

(1) The first and second rectangular planes of the secondary light source-forming prism are parallel to each other.

(2) The first and second rectangular planes of the secondary light source-forming prism are flat.

(3) The first rectangular plane of the secondary light source-forming prism is flat, and the second rectangular plane of the secondary light source-forming prism is a curved plane.

(4) The second rectangular plane has a center of curvature on an extension line which is strongest in an emitted light intensity distribution of the light-emitting diode.

(5) The secondary light source-forming prism is arranged such that the first rectangular plane is vertical to an extension which is stronger in an emitted light intensity distribution of the light-emitting diode.

(6) The secondary plane of the secondary light source-forming prism has an aspect ratio identical with that of said light valve.

(7) The polygonal planes of the secondary light source-forming prism are trapezoidal or rectangular.

(8) The solid angle of the light flux emitted from the LED1, entering the first rectangular plane of the secondary light source-forming prism 42 and emitted from a polygonal plane of the secondary light source-forming prism 42 needs to be not less than 2 $\phi$ provided that the secondary light source-forming prism 42 has as its optical axis a straight line connecting the center of the first rectangular plane and that of the second rectangular plane and that the solid angle (entire angle) of the light flux emitted from the LED1 and emitted from the second rectangular plane of the secondary light source-forming prism 42 is 2$\phi$.

(9) The light flux emitted from the center of the polygonal planes is led to almost the center of the light valve.

(10) The following relation exists:

$$nd \times \sin\{(90-\beta)-\alpha\}/\sin(90-\beta)=1$$

in which "$\alpha$" is an angle inside the secondary light source-forming prism between the optical axis and a light beam passing the center of light flux which is emitted from the light-emitting diode, enters the first rectangular plane and then is emitted from the trapezoidal plane of the secondary light source-forming prism, while "$\beta$" is an angle between the trapezoidal plane and the optical axis, and nd is a refractive index of a material of the secondary light source-forming prism at a d-line of sodium.

(11) The light-emitting diode is a bombshell type light-emitting diode.

(12) The light-emitting diode is a reflection type light-emitting diode.

(13) The light-emitting diode and said secondary light source-forming prism comprises plural units each consisting of a light-emitting diode and a corresponding secondary light source-forming prism, and a light source is constructed by arranging said plural units side by side.

(14) The light source comprises at least one red light-emitting diode, at least one green light-emitting diode and at least one blue light-emitting diode.

(15) The image-displaying apparatus set forth in claim 15, wherein the light source comprises a cross dichroic prism.

According to the present invention, the following projector and the following image-observing apparatus are provided.

(16) A projector comprises the image-displaying apparatus set forth in any one of the and a projecting optical system.

An image-observing apparatus comprises the image-displaying apparatus set forth in any one of claims 1 to 16 and an eyepiece optical system.

As mentioned above, according to the image-displaying apparatus of the present invention between the light-emitting diode and the relay lens is arranged the secondary light source-forming prism having opposed first and second opposed rectangular planes and at least four polygonal planes, said first and second rectangular planes being positioned on sides of the light-emitting diode and the light valve, respectively, and an area of the first rectangular plane being greater than that of the second rectangular plane.

When the secondary light source-forming prism is coupled with each of the light-emitting diodes and the light flux emitted from each of the light-emitting diodes is divided into plural ones (at least five), the effect of the oriented light distribution and characteristics of the light-emitting diode upon the uneven illuminance can be reduced.

Further, when the secondary light source-forming prism is used as in the present invention, the using efficiency of the light can be enhanced as compared with the conventional technique. Thus, the image-displaying apparatus having high light takeout efficiency from the light-emitting diode, that is, the bright image-displaying apparatus can be realized.

Further, since the F-number of the release lens can be increased as compared with the conventional one.

BRIEF DESCRIPTION OF THE DRAWINGS

For a better understanding of the invention, reference is made to the attached drawings, wherein.

DETAILED DESCRIPTION OF THE INVENTION

Embodiments of the present invention will be explained with reference to the attached drawings. First, the fundamental construction of the image-displaying apparatus utilizing the LED will be explained prior to entering the explanation of the embodiments of the present invention.

Figure 1:
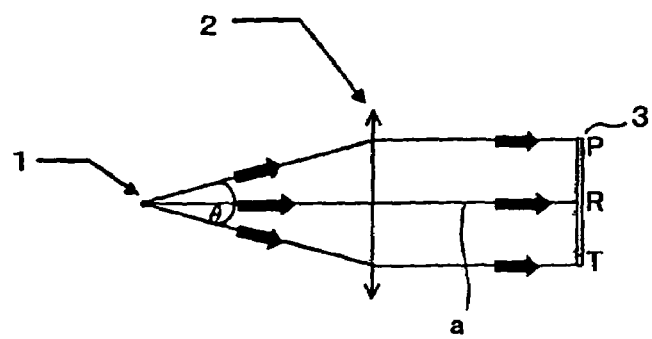
FIG. 1 shows a fundamental construction of an image-displaying apparatus using a LED.

FIG. 1 shows the fundamental construction of the image-displaying apparatus utilizing the LED.

The image-displaying apparatus of FIG. 1 comprises a light-emitting diode (LED) 1 as a point-source light, a relay lens 2, and a light valve 3. For example, the LED 1 is a reflection type LED in which the light intensity in the orientated light distribution decreases by 1% every angle of 1 degree as measured from the center of the emitted light flux. The release lens 2 is an ideal lens having an F-number of 1.87. The light valve 3 is in a square shape having an aspect ratio of 1:1, while its size is arbitrary.

In the thus constituted image-displaying apparatus, consideration is made of an illuminating system in which the LED 1 is arranged at a focus of the release lens 2. The maximum solid angle θ of a light flux led to the light valve 3 via the release lens 2 is about 30 degrees in a plan containing an optical axis "a" and vertical to sides of the light valve 3, provided that a straight line connecting the LED 1 and the center of the light valve 3 is taken as the optical axis "a". Further, an uneven illuminance is 15% between the center R and the outermost periphery P, T of the light valve 3. That is, the light intensity at the outermost periphery P, T of the light valve 3 is about 85% of that at the center thereof. The maximum solid angle is primarily set to correspond to a diagonal length direction of the light valve 3, but the maximum solid angle is deemed to correspond to the side of the light valve 3 for facilitation of the explanation.

The image-displaying apparatuses according to embodiments of the present invention will be explained below.

Figure 2:
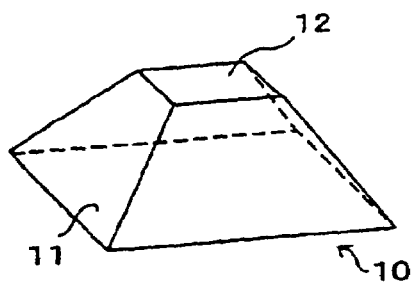
FIG. 2 shows the structure of a secondary light source-forming prism to be used in a first embodiment of the image-displaying apparatus according to the present invention.

FIG. 2 shows the structure of a secondary light source-forming prism in a first embodiment of the image-displaying apparatus according to the present invention. The secondary light source-forming prism 10 comprises two rectangular planes: a first rectangular plane 11 and a second rectangular plane 12 and four trapezoidal planes. Since the aspect ratio of the light valve 3 in FIG. 1 is set at 1:1, explanation will be made in the present embodiment on the assumption that the rectangular planes of the secondary light source-forming prism 10 are square. The shape of the retangular planes can be arbitrarily selected depending upon the aspect ratio of the lens bulb 3.

Figure 3:
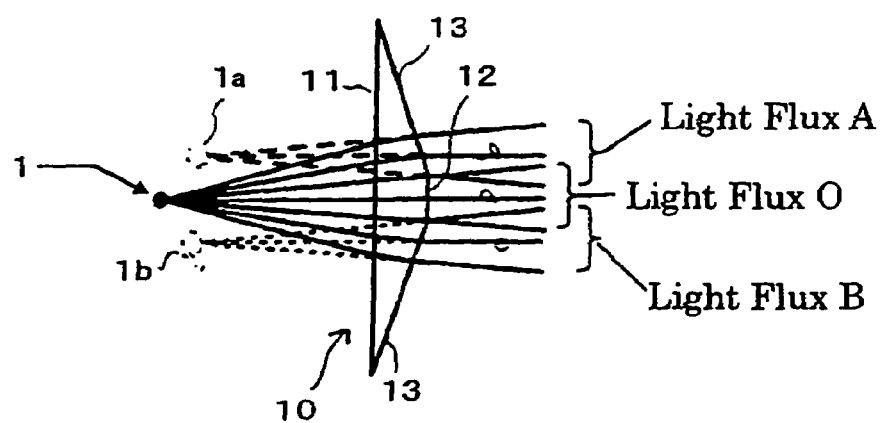
FIG. 3 shows the construction of an LED portion using the secondary light source-forming prism.

FIG. 3 shows the construction of the LED portion using the above secondary light source-forming prism.

The LED section shown in FIG. 3 is constituted by the LED 1 of FIG. 1 as the point-source light and the secondary light source-forming prism 10 of FIG. 2 which is arranged near the LED 1. In this case, as shown in FIG. 3, the light flux emitted from the LED 1 at a solid angle of 30° can be divided into three light fluxes A, O and B by the secondary light source-forming prism 10. Noting the light fluxes passing the trapezoidal planes 13 of the second light source-forming prism 10, it is seen that virtual images LED 1a and LED 1b of the LED are formed as the light source at positions as shown. In this embodiment, the virtual images LED 1a, 1b of the LED 1 are called as secondary light sources. Since the secondary light source-forming prism 10 of FIG. 2 has four trapezoidal planes, the light flux can be divided into five. Further, although the secondary light sources 1a, 1b are positionally slightly different from the primary light source 1 in the axial direction, this does not cause a big problem. As mentioned later, the positional alignment can be made by curving the rectangular plane 12 of the secondary light source-forming prism 10.

Figure 4:
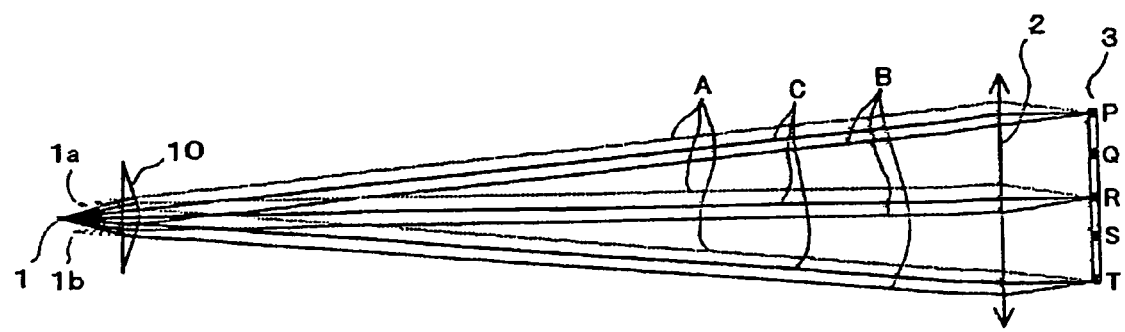
FIG. 4 shows the construction of an image-displaying apparatus according to the present embodiment of the present invention.

FIG. 4 shows a first embodiment of the image-displaying apparatus according to the present invention. The image-displaying apparatus of FIG. 4 is constituted by the LED 1, the secondary light source-forming prism 10, the relay lens 2 and the light valve 3. As shown in the above, the light intensity in the orientated light distribution is decreased by 1% every angle of 1° as measured from the center of the emitted flux. The secondary light source-forming prism is made of a material having a d-line refractive index nd=1.517. The release lens 2 is an ideal lens having the F-number of 1.87. The light valve 3 is in a square shape having an aspect ratio of 1:1, while its size is arbitrary.

In the thus constructed image-displaying apparatus according to this embodiment, the illuminance distribution on the light valve 3 is examined. The intensity of the light emitted from the LED 1 in the central direction is taken as 100, and the light valve 3 is divided by five points P, Q, R, S and T as shown. Illuminacence values at the five-divided points (P, Q, R, S and T) of the light valve 3 are plotted in the following tables.

The illuminance distribution formed by the central light flux C is given below.

| P: 95 | Q: 97.5 | R: 100 | S: 97.5 | T: 95 |

The illuminance distribution formed by the light flux A is given below.

| P: 85 | Q: 87.5 | R: 90 | S: 92.5 | T: 95 |

The illuminance distribution formed by the light flux B is given below.

| P: 95 | Q: 92.5 | R: 90 | S: 87.5 | T: 85 |

The summed illuminace distribution of the above data on the light valve 3 is given below.

| P: 275 | Q: 277.5 | R: 280 | S: 277.5 | T: 275 |

When the image-displaying apparatus is constituted like this, the uneven illuminance can be reduced such that the illuminance difference is 1% between the central position R and its peripheral positions Q and S and less than 2% between the central portion R and the end positions P and T. Needless to say, calculation results of the uneven illuminance are also applicable even in a plane vertical to FIG. 4.

When the secondary light source-forming prism 10 is used, the light-utilizing efficiency can be enhanced as compared with the prior art technique. Therefore, the F-number of the release lens 2 can be increased as compared with the prior art technique. That is, the F-number can be increased from F1.87 to F 5.71, while the relay lens 2 can be miniaturized with the decreased number of the relay lenses.

For example, the angle which is formed between the polygonal plane (trapezoidal plane) and the rectangular plane of the secondary light source-forming prism 10 is preferably so set that when the release lens 2 is telecentric with a side of the light source, the light beam passing the center of the light fluxes emitted from the polygonal planes may be in parallel to the optical axis, because the light flux can be desirably utilized sufficiently for illumination.

Figure 5:
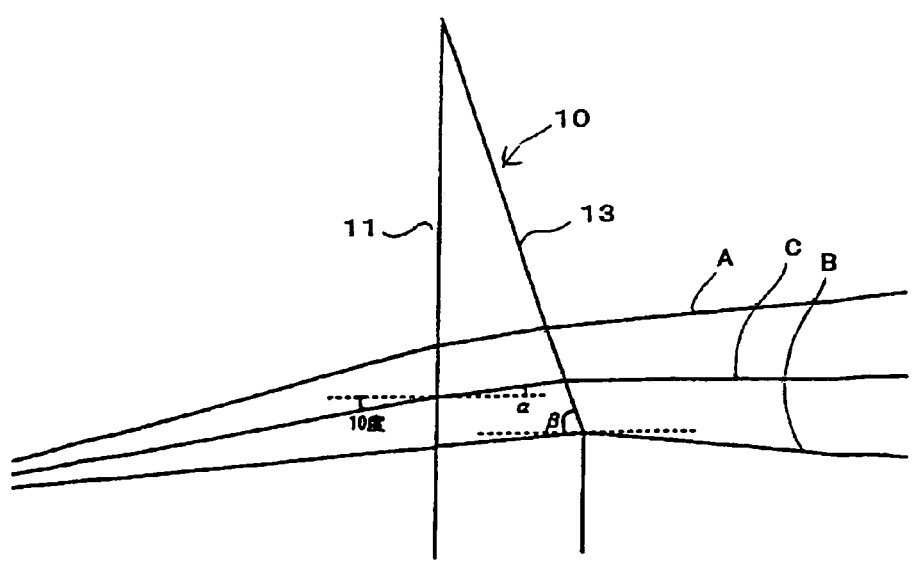
FIG. 5 shows optical paths of the secondary light source-forming prism.

Thus, in the present embodiment, as shown in FIG. 5, the following relation exists:

$$nd \times \sin\{(90-\beta)-\alpha\}/\sin(90-\beta)=1$$

in which "α" is an angle inside the secondary light source-forming prism between the optical axis and a light beam passing the center of light flux A, B and C which is emitted from the light-emitting diode, enters the first rectangular plane and then is emitted from the trapezoidal plane of the secondary light source-forming prism, while "β" is an angle between the trapezoidal plane and the optical axis, and a material of the secondary light source-forming prism at a d-line of sodium.

As shown, it is preferable to mach the angle between the rectangular plane 11 and the polygonal plane 13 of the secondary light source-forming prism 10 with the off-axis characteristics of the release lens 2.

The above JP-A 2004-146200 and Japanese patent No. 3257646 propose similar techniques to the secondary light source-forming prism 10 in the present embodiment, however the prism described in JP-A 2004-146200 is intended for the direct-view type organic EL display, which effectively takes out the image-displaying light from each pixel in a front-face direction only. To the contrary, the prism in this embodiment is directed for obtaining the illuminating light. In order to reduce unevenness of the illuminance, the prism needs at least four polygonal planes. Further, in order to lead the light to the light valve, the release lens 2 is necessary. Therefore, the present invention differs from the prism in JP-A 2004-146200 in terms of the object and the construction. The prism of Japanese patent No. 3257646 has the object quite different from that of the present invention, so that the prism does not need any rectangular plane, and its construction quite differs from that of the present invention.

In the illustrated embodiment, the angle between the optical axis and the light beam passing the center of the light flux emitted from the polygonal plane of the secondary light source-forming prism 10 as shown in FIG. 4 is not limited to zero ("parallel") to the optical axis. For example, the side planes of the secondary light source-forming prism 10 can be constituted by a plane having a curvature, such as a conical plane, different from the polygonal planes. However, the side planes different from those shown in FIG. 4 will have a curvature, so that the secondary light sources will be undesirably positionally deviated.

Next, a second embodiment of the image-displaying apparatus according to the present invention will be explained below.

The image-displaying apparatus according to the second embodiment shows the illuminance distribution when the solid angle θ of the emitted light flux of the LED in the same orientated light distribution as in the first embodiment is further taken in a range of 30 degrees to 60 degrees.

Figure 6:
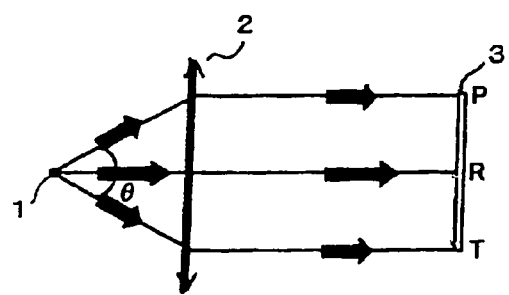
FIG. 6 shows the construction of an image-displaying device equipped with no secondary light source-forming prism.
Figure 7:
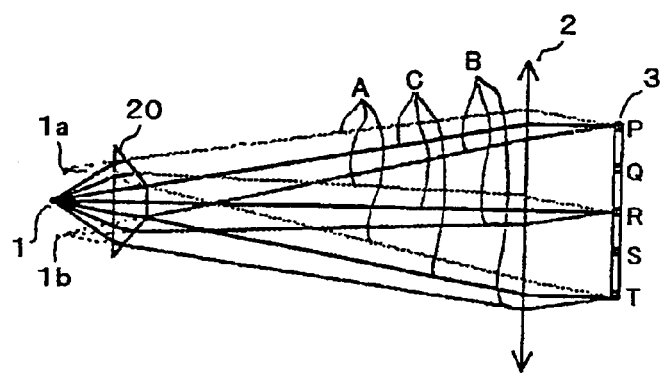
FIG. 7 shows the construction of an image-displaying device equipped with a secondary light-forming prism.

FIG. 6 shows the construction of an image-displaying apparatus in which no secondary light source-forming prism is disposed. FIG. 7 shows the construction of an image-displaying apparatus in which a secondary light source-forming prism is disposed. In this case, the open angle of the trapezoid of the secondary light source-forming prism 20 from the LED along the optical axis is larger as compared with the first embodiment. Corresponding to this, when the light fluxes are traced, an end portion of each of the light fluxes A and B does not enter the light valve 3, resulting in a loss, which does not cause a great effect. Thus, as shown in FIG. 7, assuming that all the lights from the secondary light sources 1a and 1b enter the light valve 3 while ignoring this effect, the illuminance distribution is obtained below by performing the same calculations as in the case with the first embodiment.

The illuminance distribution formed by the light flux C is given below.

| P: 90 | Q: 95 | R: 100 | S: 95 | T: 90 |
|---|---|---|---|---|

The illuminance distribution formed by the light flux A is given below.

| P: 70 | Q: 75 | R: 80 | S: 85 | T: 90 |
|---|---|---|---|---|

The illuminance distribution formed by the light flux B is given below.

| P: 90 | Q: 85 | R: 80 | S: 75 | T: 70 |
|---|---|---|---|---|

The added illuminance distribution formed by the light fluxes A, B and C is given below.

| P: 260 | Q: 255 | R: 260 | S: 255 | T: 260 |
|---|---|---|---|---|

The uneven illuminance can be reduced to less than 2% between the central position R and its peripheral positions Q and S and 0% between the central portion R and the end positions P and T.

Next, a third embodiment of the image-displaying apparatus according to the present invention will be explained.

Figure 8:
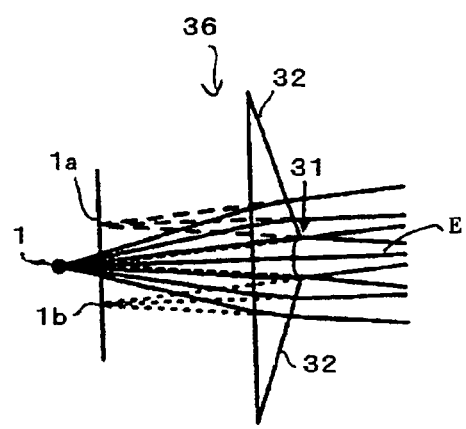
FIG. 8 shows the construction of an LED portion using a secondary light source-forming prism as a third embodiment of the present invention.

FIG. 8 shows the construction of an LED portion utilizing a secondary light source-forming prism as the third embodiment.

The secondary light source-forming prism shown in FIG. 8 has a second rectangular plane 31 having a curved face on a light-emitting side. The second rectangular surface 31 has a center of curvature on an extension line E corresponding to a light flux which has strongest intensity in an emitted light intensity distribution of the light-emitting diode. In this case, as shown in FIG. 8, the virtual image of the light source of the central light flux is aligned with locations 1a, 1b of the secondary light sources in the optical-axis direction of the light fluxes passing trapezoidal planes 32 of the secondary light source-forming prism 30. This LED portion is more preferable than that explained in the first embodiment.

Figure 9:
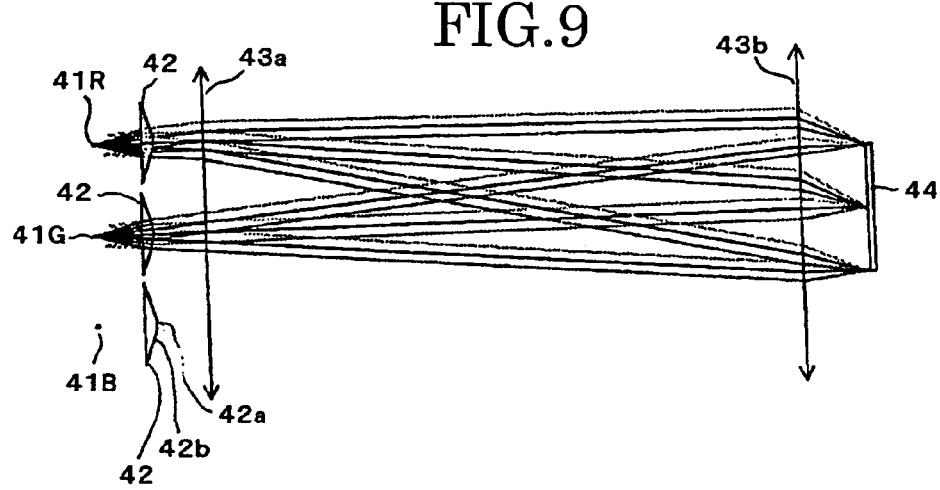
FIG. 9 shows one consruction of a color image-displaying apparatus according to he present invention.

FIG. 9 shows the construction of a color image-displaying apparatus to which the image-displaying apparatus of the present invention is applied.

A color image-displaying apparatus shown in FIG. 9 comprises a red LED 41R, a green LED 41G, a blue LED 41B, secondary light source-forming prisms 42, 42 and 42 corresponding to the LEDs 41R, 41G and 41B, respectively, and each having two squire planes and four trapezoidal planes, two release lenses 43a and 43b which are ideal lenses telecentric on a side of the light source, and a light valve 44 having an aspect ratio of 4:3.

In the thus constructed color image-displaying apparatus, the color displaying is performed by turning on and off the red, green and blue LEDs 41R, 41G and 41B on the basis of "time division", which is generally called field-sequential.

In this case, since the central light flux emitted from the second rectangular plane 42a of the secondary light source-forming prism 42 corresponds to the light valve 44, the second rectangular plane 42a has the same aspect ratio as that of the light valve 44. With respect to the sizes of the polygonal planes 42b, not what is the aspect ratio but whether the divided light fluxes sufficiently illuminate the entire light valve 44 or not is important. Thus, the size of the polygonal plane 42b is acceptable so long as the polygonal plane 42b does not hinder the light flux from entering the light valve. Although not shown, the solid angle of the light flux which is emitted from the LED1, enters the first rectangular plane of the secondary light source-forming prism 42 and is emitted from a polygonal plane of the secondary light source-forming prism 42 needs to be not less than 2 φ, provided that the secondary light source-forming prism 42 has as its optical axis a straight line connecting the center of the first rectangular plane to that of the second rectangular plane and that the solid angle (entire angle) of the light flux emitted from the LED1 and emitted from the second rectangular plane of the secondary light source-forming prism 42 is taken as 2φ.

In the first embodiment, the angle between each of the polygonal planes and the rectangular plane of the secondary light source-forming prism 42 is set such that the light beam passing the center of the light flux may be emitted from the polygonal plane 42b in parallel to the optical axis. Therefore, when the release lenses 43a and 43b are telecentric on the side of the light source, the light emitted from each of the light sources 41 may be sufficiently utilized even when the LEDs 41 and the light source units of the second light source-forming prisms 42 are arranged on a plane.

Assuming that the light source units are arrayed in plane, the angle between the rectangular plane 42a and the polygonal plane 42b of the secondary light source-forming prism 42 is desirably set such that the light beam passing the center of the light flux emitted from the polygonal plane 42b may be emitted in parallel to the optical axis. At this time, it is preferred to combine the telecentric release lenses on the side of the light source.

Figure 10:
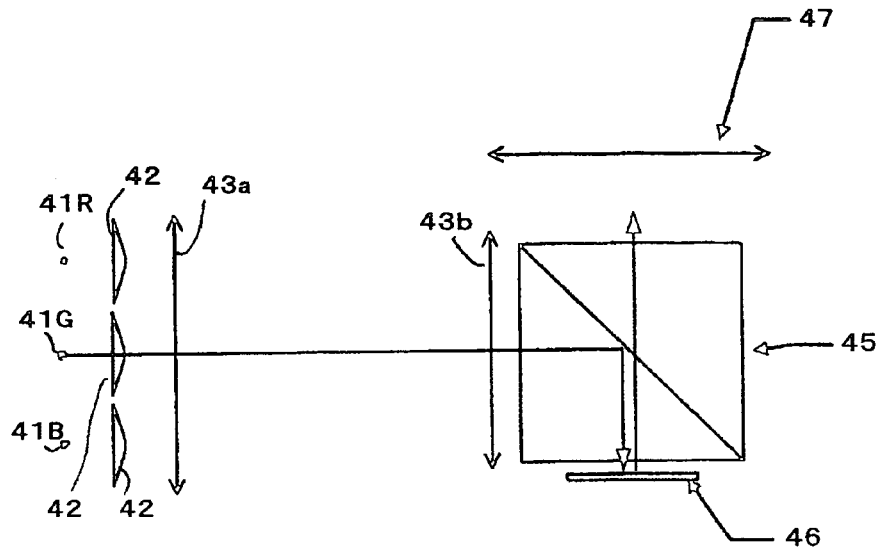
FIG. 10 shows a concrete construction of the color image-displaying apparatus shown in FIG. 9.

FIG. 10 shows a specific construction of a projector as one of the color image-displaying apparatuses as shown in FIG. 9.

The projector can be constructed by arranging a PBS 45 having a polarization-converting function, a reflective type liquid crystal 46, and a projecting lens 47 as shown in FIG. 10.

Next, a fourth embodiment of the image-displaying apparatus will be explained.

Figure 11:
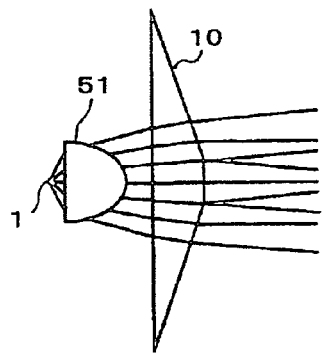
FIG. 11 shows the construction of a LED portion as a fourth embodiment of the present invention.

FIG. 11 shows the construction of an LED portion as the fourth embodiment of the present invention. In the LED portion shown in FIG. 11, a coupling lens 51 is arranged between the LED1 and the secondary light source-forming prism 10 of the LED portion shown in FIG. 3. The structure in which the coupling lens 51 is arranged in combination with the LED 1 is known as a bombshell type LED. This embodiment is the combination with the secondary light source-forming prism 10. As shown in FIG. 11, the image-displaying apparatus can be used without any change in the way of utilizing the secondary light source-forming prism 10, even when the bombshell type LED is employed.

Next, a fifth embodiment of the image-displaying apparatus according to the present invention will be explained.

Figure 12:
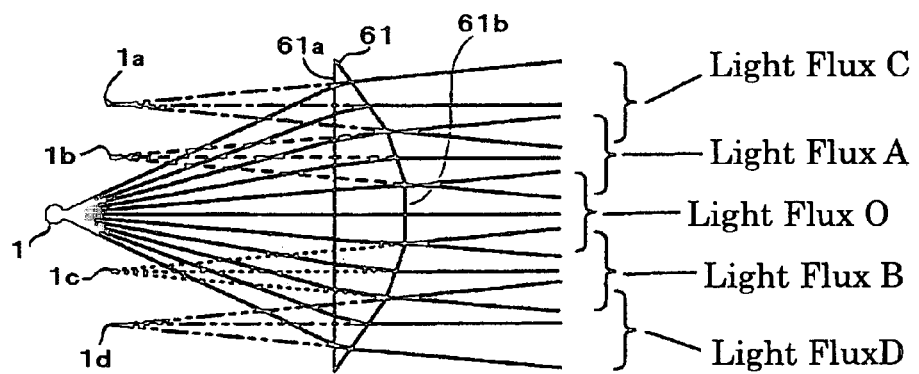
FIG. 12 shows the construction of an LED portion to be applied to the image displaying apparatus as a fourth embodiment.

FIG. 12 shows the construction of an LED portion to be applied to the image-displaying apparatus as the fifth embodiment of the present invention. A secondary light source-forming prism 61 shown in FIG. 12 has an increased number of 8 polygonal planes, so that a light flux emitted from the LED 1 at a solid angle of 50 degrees in a plane containing an optical axis and being vertical to a first rectangular plane 61a and a second rectangular plane 61b can be divided into light fluxes O, A, B, C and D each at a solid angle of 10 degrees.

Figure 13:
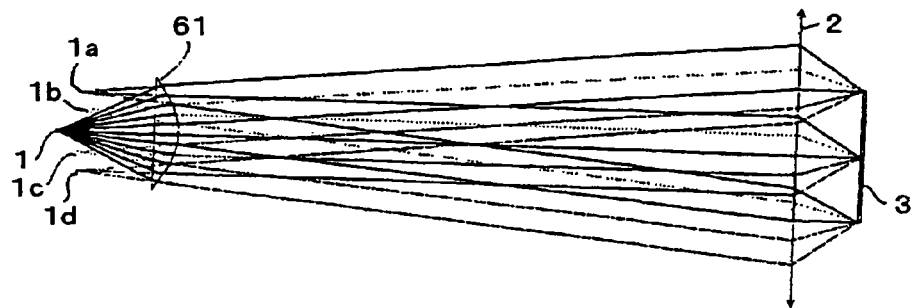
FIG. 13 shows a first embodiment of the image-displaying apparatus according to one embodiment of the image-displaying apparatus as shown in FIG. 13.

FIG. 13 shows the fifth embodiment of the image-displaying apparatus according to the present invention shown in FIG. 12.

The image-displaying apparatus shown in FIG. 13 is constituted by an LED 1, a secondary light source-forming prism 61, a release lens 2, and a light valve 3. According to the thus constructed image-displaying apparatus of this embodiment, when the number of the polygonal planes of the secondary light source-forming prism 61 is increased, the orientated light distribution possessed by each light flux can be made narrower and the uneven illuminance can be reduced.

As shown in FIG. 13, even the large light flux having the solid angle of 50 degrees can be divided into the light fluxes each having the solid angle of 10 degrees. Therefore, the light-utilizing efficiency can be enhanced by using the secondary light source-forming prism 61 as compared with the conventional technique. Thus, the F-number of the release lens 2 can be increased as compared with the prior art technique. That is, the F-number can be increased from F1.87 to F5.71, so that the release lenses 2 can be made smaller and the number of the lenses can be reduced.

Figure 14:
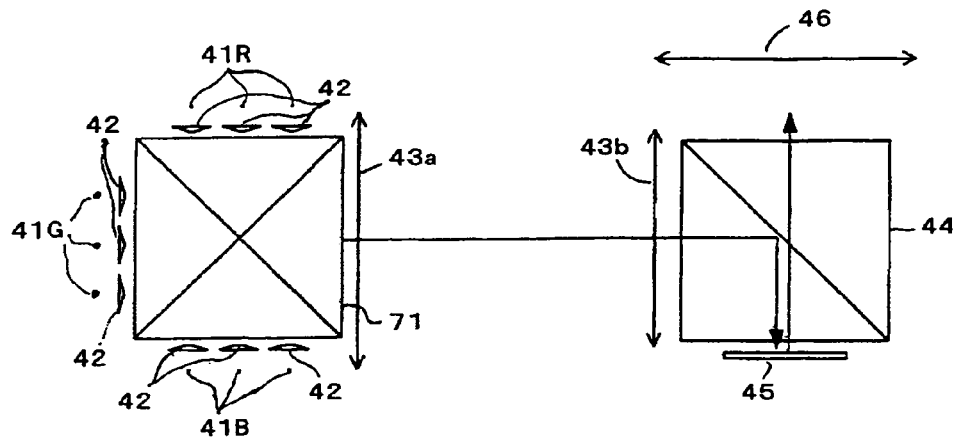
FIG. 14 shows the concrete construction of the color image-displaying apparatus shown in FIG. 13.
Figure 15:
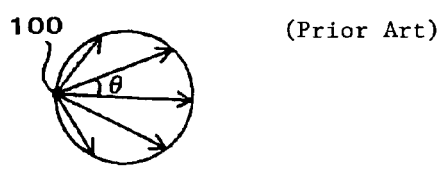
FIG. 15 shows the orientated light distribution of a bared chip type LED.
Figure 16:
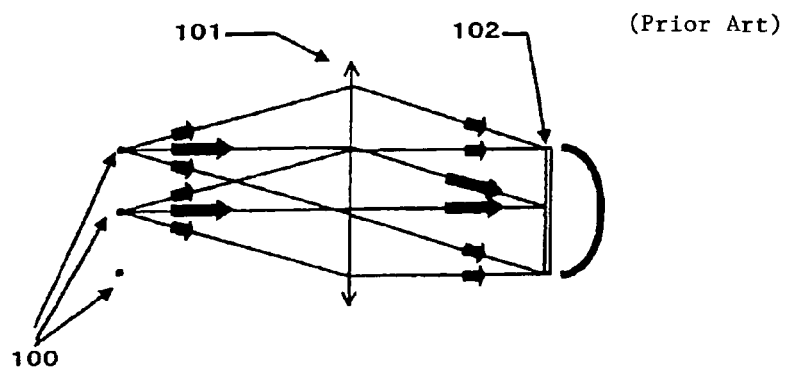
FIG. 16 shows the construction of an image-forming device using the LED having the orientated light distribution shown in FIG. 15.

FIG. 14 shows the concrete construction of a projector using the color image-displaying apparatuses as shown in FIG. 13. The same reference numerals are given to the same portions and the same parts as in FIG. 10, and their explanation is omitted.

Color displaying is effected by turning on and off red LEDs 41R, green LEDs 41G and blue LEDs 41B shown in FIG. 14 based on the time division system. Each set of the red LEDs 41R, the green LEDs 41G and the LEDs 41B are arranged toward a cross-dichroic prism 71. This is because the enlargement of the plane of the LED array is not optically preferable. For, as the plane of the LED array increases, the off-axis performance of the release lens needs be enhanced, and the F-number of the projection lens 46 needs to be further brightened.

When the cross dichroic prism 71 is used as shown in FIG. 14, three times as much as the light flux as otherwise introduced can be introduced into the light valve 45 at the same performance as a single plane with respect to the release lenses 43a, 43b.

In this embodiment, explanation is made of the construction of the image-displaying apparatus by taking the projector as example, in which the image-displaying apparatus according to the present invention is combined with the projecting optical system. This is only one example, and it is needless to say that an image-observing apparatus is constituted by combining the image-displaying apparatus according to the present invention with an eyepiece optical system.

What is claimed is:

1. An image-displaying apparatus comprising:
   at least one light-emitting diode,
   a relay lens,
   at least one secondary light source-forming prism arranged between the light-emitting diode and the relay lens, and
   a light valve,
   said at least one secondary light source-forming prism having an incident rectangular surface, an exit rectangular surface opposed to the incident rectangular surface, and at least four polygonal surfaces each extending from the incident rectangular surface; the incident rectangular surface facing the at least one light-emitting diode; the exit rectangular surface facing the relay lens;
   a surface area of the incident rectangular surface being greater than a surface area of the exit rectangular surface so that the exit rectangular surface and the at least four polygonal surfaces divide light which is emitted from the light-emitting diode and enters the incident rectangular surface, into a first light flux and second light fluxes,
   wherein the first light flux is emitted from the light-emitting diode, enters the incident rectangular surface and is emitted from the exit rectangular surface;
   wherein the second light fluxes are emitted from the light-emitting diode, enter the incident rectangular surface, and are transmitted and emitted from at least one polygonal surface of the at least four polygonal surfaces; and
   wherein the relay lens is illuminated by the first light flux and the second light fluxes.

2. The image-displaying apparatus set forth in claim 1, wherein the incident and exit rectangular surfaces of the secondary light source-forming prism are parallel to each other.

3. The image-displaying apparatus set forth in claim 2, wherein the secondary light source-forming prism is arranged such that the incident rectangular surface is vertical to an extension line corresponding to a light flux which has strongest intensity in an emitted light intensity distribution of the light-emitting diode.

4. The image-displaying apparatus set forth in claim 3, wherein said light-emitting diode and said secondary light source-forming prism comprises plural units each consisting of a light-emitting diode and a corresponding secondary light source-forming prism, and a light source is constructed by arranging said plural units side by side.

5. The image-displaying apparatus set forth in claim 4, wherein said light source comprises at least one red light-emitting diode, at least one green light-emitting diode and at least one blue light-emitting diode.

6. The image-displaying apparatus set forth in claim 5, wherein the light source comprises a cross dichroic prism.

7. The image-displaying apparatus set forth in claim 2, wherein said light-emitting diode and said secondary light source-forming prism comprises plural units each consisting of a light-emitting diode and a corresponding secondary light source-forming prism, and a light source is constructed by arranging said plural units side by side.

8. The image-displaying apparatus set forth in claim 7, wherein said light source comprises at least one red light-emitting diode, at least one green light-emitting diode and at least one blue light-emitting diode.

9. The image-displaying apparatus set forth in claim 8, wherein the light source comprises a cross dichroic prism.

10. The image-displaying apparatus set forth in claim 1, wherein the incident and exit rectangular surfaces of the secondary light source-forming prism are flat.

11. The image-displaying apparatus set forth in claim 10, wherein the secondary light source-forming prism is arranged such that the incident rectangular surface is vertical to an extension line corresponding to a light flux which has strongest intensity in an emitted light intensity distribution of the light-emitting diode.

12. The image-displaying apparatus set forth in claim 11, wherein said light-emitting diode and said secondary light source-forming prism comprises plural units each consisting of a light-emitting diode and a corresponding secondary light source-forming prism, and a light source is constructed by arranging said plural units side by side.

13. The image-displaying apparatus set forth in claim 12, wherein said light source comprises at least one red light-emitting diode, at least one green light-emitting diode and at least one blue light-emitting diode.

14. The image-displaying apparatus set forth in claim 13, wherein the light source comprises a cross dichroic prism.

15. The image-displaying apparatus set forth in claim 10, wherein said light-emitting diode and said secondary light source-forming prism comprises plural units each consisting of a light-emitting diode and a corresponding secondary light source-forming prism, and a light source is constructed by arranging said plural units side by side.

16. The image-displaying apparatus set forth in claim 15, wherein said light source comprises at least one red light-emitting diode, at least one green light-emitting diode and at least one blue light-emitting diode.

17. The image-displaying apparatus set forth in claim 16, wherein the light source comprises a cross dichroic prism.

18. The image-displaying apparatus set forth in claim 1, wherein the incident rectangular surface of the secondary light source-forming prism is flat, and the exit rectangular surface of the secondary light source-forming prism is a curved surface.

19. The image-displaying apparatus set forth in claim 18, wherein the exit rectangular surface has a center of curvature on an extension line corresponding to a light flux which has strongest intensity in an emitted light intensity distribution of the light-emitting diode.

20. The image-displaying apparatus set forth in claim 5, wherein said light-emitting diode and said secondary light source-forming prism comprises plural units each consisting of a light-emitting diode and a corresponding secondary light source-forming prism, and a light source is constructed by arranging said plural units side by side.

21. The image-displaying apparatus set forth in claim 20, wherein said light source comprises at least one red light-emitting diode, at least one green light-emitting diode and at least one blue light-emitting diode.

22. The image-displaying apparatus set forth in claim 21, wherein the light source comprises a cross dichroic prism.

23. The image-displaying apparatus set forth in claim 18, wherein the secondary light source-forming prism is arranged such that the incident rectangular surface is vertical to an extension line corresponding to a light flux which has strongest intensity in an emitted light intensity distribution of the light-emitting diode.

24. The image-displaying apparatus set forth in claim 23, wherein said light-emitting diode and said secondary light source-forming prism comprises plural units each consisting of a light-emitting diode and a corresponding secondary light source-forming prism, and a light source is constructed by arranging said plural units side by side.

25. The image-displaying apparatus set forth in claim 24, wherein said light source comprises at least one red light-emitting diode, at least one green light-emitting diode and at least one blue light-emitting diode.

26. The image-displaying apparatus set forth in claim 25, wherein the light source comprises a cross dichroic prism.

27. The image-displaying apparatus set forth in claim 18, wherein said light-emitting diode and said secondary light source-forming prism comprises plural units each consisting of a light-emitting diode and a corresponding secondary light source-forming prism, and a light source is constructed by arranging said plural units side by side.

28. The image-displaying apparatus set forth in claim 27, wherein said light source comprises at least one red light-emitting diode, at least one green light-emitting diode and at least one blue light-emitting diode.

29. The image-displaying apparatus set forth in claim 28, wherein the light source comprises a cross dichroic prism.

30. The image-displaying apparatus set forth in claim 1, wherein the secondary surface of the secondary light source-forming prism has an aspect ratio identical with that of said light valve.

31. The image-displaying apparatus set forth in claim 30, wherein said light-emitting diode and said secondary light source-forming prism comprises plural units each consisting of a light-emitting diode and a corresponding secondary light source-forming prism, and a light source is constructed by arranging said plural units side by side.

32. The image-displaying apparatus set forth in claim 31, wherein said light source comprises at least one red light-emitting diode, at least one green light-emitting diode and at least one blue light-emitting diode.

33. The image-displaying apparatus set forth in claim 32, wherein the light source comprises a cross dichroic prism.

34. The image-displaying apparatus set forth in claim 1, wherein the polygonal surfaces of the secondary light source-forming prism are trapezoidal or rectangular.

35. The image-displaying apparatus set forth in claim 34, wherein said light-emitting diode and said secondary light source-forming prism comprises plural units each consisting of a light-emitting diode and a corresponding secondary light source-forming prism, and a light source is constructed by arranging said plural units side by side.

36. The image-displaying apparatus set forth in claim 35, wherein said light source comprises at least one red light-emitting diode, at least one green light-emitting diode and at least one blue light-emitting diode.

37. The image-displaying apparatus set forth in claim 36, wherein the light source comprises a cross dichroic prism.

38. The image-displaying apparatus set forth in claim 1, wherein
the secondary light source-forming prism has an optical axis corresponding to a straight line connecting a center of the incident rectangular surface and a center of the exit rectangular surface; and
a solid angle of the light flux which is emitted from the LED, enters the incident rectangular surface of the secondary light source-forming prism and is emitted from each of the polygonal surfaces of the secondary light source-forming prism is equal to or more than a solid angle of the light flux which is emitted from the LED and then emitted from the exit rectangular surface of the secondary light source-forming prism in a plane which is vertical to short sides or long sides of the exit rectangular surface of the secondary light source-forming prism and includes the optical axis.

39. The image-displaying apparatus set forth in claim 38, wherein the light flux emitted from the center of the polygonal surfaces is led to the center of the light valve.

40. The image-displaying apparatus set forth in claim 39, wherein said light-emitting diode and said secondary light source-forming prism comprises plural units each consisting of a light-emitting diode and a corresponding secondary light source-forming prism, and a light source is constructed by arranging said plural units side by side.

41. The image-displaying apparatus set forth in claim 40, wherein said light source comprises at least one red light-emitting diode, at least one green light-emitting diode and at least one blue light-emitting diode.

42. The image-displaying apparatus set forth in claim 41, wherein the light source comprises a cross dichroic prism.

43. The image-displaying apparatus set forth in claim 38, wherein the light flux which is emitted from the light-emitting diode, enters the first incident rectangular surface and then emitted from the polygonal surface satisfies the following relation:

$$nd \times \sin\{(90-\beta)-\alpha\}/\sin(90-\beta)=1$$

in which "$\alpha$" is an angle between the optical axis and a light beam passing a center of the light flux which enters the incident rectangular surface of the secondary light source-forming prism, "$\beta$" is an angle between the trapezoidal plane and the optical axis, and nd is a refractive index of a material of the secondary light source-forming prism at a d-line of sodium.

44. The image-displaying apparatus set forth in claim 43, wherein said light-emitting diode and said secondary light source-forming prism comprises plural units each consisting of a light-emitting diode and a corresponding secondary light source-forming prism, and a light source is constructed by arranging said plural units side by side.

45. The image-displaying apparatus set forth in claim 44, wherein said light source comprises at least one red light-emitting diode, at least one green light-emitting diode and at least one blue light-emitting diode.

46. The image-displaying apparatus set forth in claim 45, wherein the light source comprises a cross dichroic prism.

47. The image-displaying apparatus set forth in claim 38, wherein said light-emitting diode and said secondary light source-forming prism comprises plural units each consisting of a light-emitting diode and a corresponding secondary light source-forming prism, and a light source is constructed by arranging said plural units side by side.

48. The image-displaying apparatus set forth in claim 47, wherein said light source comprises at least one red light-emitting diode, at least one green light-emitting diode and at least one blue light-emitting diode.

49. The image-displaying apparatus set forth in claim 48, wherein the light source comprises a cross dichroic prism.

50. The image-displaying apparatus set forth in claim 1, wherein the light-emitting diode is a bombshell type light-emitting diode.

51. The image-displaying apparatus set forth in claim 1, wherein said light-emitting diode is a reflection type light-emitting diode.

52. The image-displaying apparatus set forth in claim 1, wherein said light-emitting diode and said secondary light source-forming prism comprises plural units each consisting of a light-emitting diode and a corresponding secondary light source-forming prism, and a light source is constructed by arranging said plural units side by side.

53. The image-displaying apparatus set forth in claim 52, wherein said light source comprises at least one red light-emitting diode, at least one green light-emitting diode and at least one blue light-emitting diode.

54. The image-displaying apparatus set forth in claim 53, wherein the light source comprises a cross dichroic prism.

55. A projector comprising the image-displaying apparatus set forth in claim 1 and a projecting optical system.

* * * * *